, 1944

UNITED STATES PATENT OFFICE 2,349,446

MANUFACTURE OF BITUMINOUS PAVEMENTS AND PAVING COMPOSITIONS

Frank B. McGrane, Quincy, Mass., assignor to Colprovia Roads, Inc., Rochester, N. Y., a corporation of New York No Drawing. Application May 9, 1940, Serial No. 334,163

9 Claims. (Cl. 106—280)

The present invention relates primarily to the manufacture of paving compositions of the type which employs bituminous materials as binders for aggregate particles and which may be laid at temperatures substantially lower than the temperatures commonly used in the manufacture of "hot-lay" compositions, wherein a paving bituminous cement is heated to a liquid condition and is applied to the aggregate, the aggregate being laid before the bitumen hardens upon cooling. Generally speaking, the present invention relates to the manufacture of compositions of the type named which initially comprise separately prepared batch portions of different physical characteristics, the batch portions being commingled and made into a single or ultimate batch prior to application to the surface to be paved thereby.

I am aware that it has been proposed heretofore to manufacture paving compositions of the type named, but such compositions have not, to my knowledge, held up and been durable, and they have exhibited considerable internal movement of the aggregate particles therein and hence waviness and pocket formation. The reason why these undesirable results came about lies in the fact that the asphaltic binder in the completed pavement was not thoroughly applied to the aggregate; that is, the different asphaltic ingredients did not and could not become satisfactorily amalgamated or blended but remained separate to a very large degree, especially shortly after laying, and hence were unable to hold the aggregate particles together.

In view of this, it is the principal object of the present invention to provide a process adapted to secure complete and thorough coating of the aggregate particles and to result in paving compositions of the type named which, in addition to being capable of being laid cold are highly resistant to internal movement and thus to undesirable waviness and pocket formation, thereby insuring toughness and long life to the pavement and minimizing maintenance cost.

Considered broadly, the present invention contemplates the proper mixing of separate batch portions of aggregate particles of different grading, respectively, with asphalt cement in liquid form, e. g., heat liquefied, cut back or emulsified, and also with non-volatile fluxing oil and powdered hard asphalt, the asphalt cement being mixed with one batch portion of the aggregate, the fluxing oil and powdered hard asphalt being mixed with the other batch portion of the aggregate, and the two batch portions, or parts thereof, being then commingled to form a single or ultimate batch. The present invention further contemplates that the ultimate batch or pluralities thereof be suitably spread on the surface to be paved, after which the composition is subjected to compaction in the usual manner, as by rolling, to effect or complete the amalgamation or blending of the bituminous materials into a homogeneous binder composition which holds and maintains the aggregate particles in properly conjoined relationship by reason of the binder homogeneity.

The aggregate materials which I contemplate using display a grading from coarse to fines. Preferably, and by way of example, the coarse aggregate particles are of such sizes as to pass a one and one-quarter inch mesh screen opening but to be retained on a one-eighth inch mesh screen opening, and the fine aggregate particles are graded from those passing a one-eighth inch mesh screen opening all the way down in size to dust. So far as the aggregate composition itself is concerned, the coarse aggregate may comprise stone, slag, gravel, or the like in either crushed or uncrushed state and the fine aggregate may comprise sand or stone screenings, all depending upon the type of paving to be laid and also upon the availability of suitable aggregate material in the vicinity of the location where mixing operations are to take place. In connection with the fine aggregate material the present invention contemplates the use, if desired, of mineral filler; that is, finely divided mineral matter such as pulverized limestone, other stone, dust, silica, hydrated limes, and the like, the bulk of which will pass a 200-mesh screen. As will be pointed out more particularly below, the coarse aggregates comprise the aggregate material for one batch portion of aggregate, and the fine aggregates and filler when used comprise the aggregate material for the other batch portion of aggregate.

The asphalt cement I contemplate using in practicing the present invention may be defined as bituminous material preferably, but not necessarily, refined from petroleum, and in one form may be semi-solid at atmospheric or normal temperatures but liquefied by heat when applied to the aggregate material, being made by distilling off the volatile and slowly volatile oils from crude petroleums so that there remain only hard asphalt and non-volatile oils in blended relationship and having a penetration substantially in excess of 10 and less than 250 under the standard test conditions of 77° F., 100 grams, and 5 seconds. Alternatively, I contemplate the use of such bituminous materials in a form in which they are liquid at normal temperatures. Thus they may be cut back asphalt cements; that is asphaltic cements made by cutting back or dissolving asphalt cement having a penetration in excess of 10 either with slowly volatile oils, thereby producing slowly curing cements, or with gasoline or naphtha, for example, thereby producing rapidly curing cements. I also contemplate using cements liquid at normal temperatures which comprise emulsions of asphalt cements with water and an emulsifying agent, the cements having the penetration characteristic stated above.

The hard asphalt I contemplate using may be either native, such as gilsonite, glance pitch, or grahamite, or it may be refined from petroleum, is solid, hard, and brittle at normal atmospheric temperatures, and is of less than 10 penetration under the standard test conditions, preferably being in the penetration range of 0 to 5. I contemplate that the hard asphalt shall be used in powdered form in practicing my invention, and for the best results I have found that the particles should be of such size that fifty per cent of them will pass 80-mesh screen and one hundred per cent a screen of 10-mesh.

As a fluxing material I contemplate the use of any suitable flux oil adapted to blend with asphalt cement and hard asphalt used in this process, such as No. 6 fuel oil, or residual petroleum oil or some tars, for examples, the characteristics of any particular flux oil being that it is relatively thick, viscous, and non-volatile. Flux oils having a viscosity of 200 to 2000 seconds Furol at 122° F. are satisfactory.

The plant apparatus used in the practice of my invention may be of any of the well known types now in use and preferably includes aggregate heaters, screens for separating the various sizes of aggregate materials, storage bins, tanks or containers for holding the asphalt cement and the powdered hard asphalt, and proportioning devices equipped with weigh hoppers or boxes and buckets for insuring that proper quantities of the various ingredients are used in preparing the batch portions. In view of the preparation of two batch portions separately and their being later commingled into one or an ultimate batch, there may be three mixers, one for each of the two batch portions and a third for mixing the two batch portions together, or there may be two mixers, one containing its own batch portion and receiving the batch portion from the other when the batch portions' commingling stage is reached. It is also possible by mixing one batch and discharging it from the mixer, then mixing the second batch in the same mixer, and thereafter introducing the first batch into the mixer to carry on the process using a single mixer. While plant mix operation is preferred, it is also possible to carry on the process on the road foundation; that is, by a mixed-in-place process. In this case, one of the two batch portions, preferably that containing coarse aggregate and paving bituminous cement may be mixed and prepared by means of suitable road mixing apparatus on the road foundation, and the other batch portion may be separately prepared and subsequently added and mixed with the first portion on the road foundation.

The aggregate heater is used for drying the aggregate, as it should not contain appreciable moisture except where asphalt cement in the liquid form of an emulsion is used, but in connection with the heater it should be pointed out that its function so far as the present invention is concerned is primarily to dry rather than to heat, as a temperature of about 175° F. is as high as I contemplate having the aggregate when preparing my composition, and it is desirable that the aggregate be much cooler, preferably at normal atmospheric temperatures or only slightly above.

When asphalt cement that is solid or semi-solid at normal temperatures is used in the practice of the present invention, the tank for holding the cement is provided with heating and heat controlling means so that the cement may be liquefied and maintained in that condition at a substantially constant temperature, preferably of approximately 300° F. and not over 325° F. The weigh bucket for the hot liquid cement also is provided with heating and heat controlling means so that between mixes of batch portions no chilled asphalt can build up and change the tare of the bucket, and the capacity of the bucket should be at least 20 per cent by weight of the total aggregate required for each batch portion to which asphalt cement is applied, since in the case of cut backs and emulsions it is the asphalt cement content, and not the total content, which determines the amount of cut back or emulsion used in a batch portion mix.

The mixers are preferably located so that they may receive their intended aggregate particles directly from the proportioning devices therefor, and in the case of the mixer which is to receive the liquid asphalt cement, the weigh bucket therefor is generally tippable so as to discharge directly into the mixer. The same is true of the mixer which is to receive the fluxing oil, should it be desired to utilize the weigh bucket thereof for discharging the oil, but it will be appreciated that so long as the correct quantity of oil is used, it is not material from what kind of a container it is discharged into the mixer. The bottom of each mixer is adapted to discharge into a hopper, for example, or directly into trucks, and while both mixers should preferably have a capacity of one ton or 2000 pounds where either is to receive the batch portion from the other, it is not necessary where three mixers are used that any more than the one in which the two batch portions are commingled be of the one ton or 2000 pounds capacity. The above described apparatus has been referred to only generally and is not illustrated by drawings, as all of it is old and well known and understood and may vary in construction and operation from plant to plant or as circumstances require.

In making an ultimate batch of paving composition in accordance with the present invention, let it be assumed for illustration that a one ton or 2000 pound ultimate batch is to be made of which, for purely exemplary purposes and not by way of any limitation in the scope of the present invention, substantially 93 per cent by weight is to be aggregate. As this amount of aggregate would amount to 1860 pounds or parts by weight for this example, each of the mixers in which a batch portion is to be mixed may conveniently, although not necessarily, be provided with 930 pounds or parts by weight of aggregate, the proper amount of each size of the coarse according to the specifications for a particular job being first admitted to the weigh box of the appropriate mixer and then discharged thereto, and the same procedure being followed as regards the fines and their mixer. Thereupon, each mixer is actuated to dry mix the aggregate particles therein until the different sizes in each mixer are thoroughly commingled and different sampling which may be taken therefrom show substantially uniform distribution of the various grade sizes. If the fine aggregate particles are to be provided with mineral filler to reduce the void content in the laid composition the filler content of the fines should not comprise more than 15 per cent by weight of the total fines, in this example amounting to not more than 93 pounds or parts by weight.

In accordance with one manner of preparing my improved paving composition the coarse aggregate particles comprising the batch portion in one mixer are treated with hot liquid asphalt cement. On the basis of an ultimate batch of 2000 pounds or parts by weight of which, for only exemplary purposes, 1860 pounds or parts by weight are aggregate material, one-half of this amount or 930 pounds or parts by weight is the coarse aggregate batch portion. Hot liquid asphalt cement at a temperature, as stated above, of about 300° F. and not over 325° F. and equalling by weight substantially 70 pounds or 3.5 per cent of the ultimate batch weight is introduced into this portion while in the mixer, the mixer being operated so that each particle of coarse aggregate therein is thoroughly coated with the cement. The time necessary for effecting such coating is variable, but as the particles of aggregate are coarse and hence have a relatively small surface area in proportion to their weight, I have found that on the average a mixing time of about 30 seconds is sufficient to coat the coarse aggregate particles with the hot liquid cement.

The fine aggregate particles of the second batch portion are first treated with non-volatile fluxing oil and powdered bitumen added to the aggregate in any sequence or simultaneously. The following exemplifies this step of the process. The oil, preferably at a temperature of around 160° F. and equalling by weight substantially 35 pounds or 1.75 per cent of the ultimate batch, is introduced into the mixer containing the fines, and the mixer is operated so that each particle therein is thoroughly coated with the flux. The time necessary for effecting such coating is also variable, but as the particles of aggregate are in this instance fines, their total surface area is relatively large in proportion to their weight, so that on the average a mixing time of about 60 seconds is sufficient to coat the fine aggregate particles and also any commingled filler with the fluxing oil.

After the mixing of the fine aggregate particles and the fluxing oil takes place, there is then introduced into the mixture thus made powdered hard asphalt substantially equal in amount by weight to that of the fluxing oil, and the operation of the mixer is continued for about 30 seconds so that the powder is thoroughly and substantially evenly distributed throughout the mass in the mixer.

As soon as each batch portion of the aggregate material is mixed with its proper materials as stated above, the batch portions are ready for commingling to make the single or ultimate batch. In view of this it will be seen that the preparation of the first batch portion stated above preferably does not begin until substantially at the time of introducing the powdered hard asphalt into the second batch portion, so that the mixing of both batch portions separately ends at the same time. When this time is reached each batch portion is discharged into a third mixer capable of holding both, or one batch portion is introduced into the mixer holding the other, and the mixer in question is then operated for about 30 seconds more, whereupon the two batch portions will be sufficiently commingled and distributed throughout each other and the powdered hard asphalt will be substantially evenly distributed throughout the entire ultimate batch so that it may be discharged from the mixer into a hopper or directly into trucks for delivery to a point of use.

The ultimate batch produced according to the foregoing example will total about one ton or 2000 pounds or parts by weight, will be about 93 per cent or 1860 pounds or parts by weight a mixture of coarse and fine aggregate materials, including mineral filler if used, will be about 3.5 per cent or 70 pounds or parts by weight asphalt cement, and 1.75 per cent or 35 pounds or parts by weight each of fluxing oil and powdered hard asphalt. The hard asphalt which is introduced into the mixture containing the fine aggregate preferably has a penetration in the 0 to 5 range under the standard test conditions stated above, and the hot liquid asphalt cement introduced into the mixer containing the coarse aggregate has a penetration substantially in excess of 20 under the standard test conditions stated above. Preferably, though not necessarily, its penetration is in the 85 to 100 range, which averages about 94 in a commercial run. With these penetrations and with the amount of flux substantially equalling by weight the amount of powdered hard asphalt, the ultimate penetration of a flux and hard asphalt mixture alone if caused to set up or completely amalgamate in the absence of the other ingredients would be approximately 50. With the amount of hot liquid asphalt cement equal in weight to that of the fluxing oil and powdered hard asphalt together, however, and with the penetration of the hot liquid asphalt cement being about 94 under the standard test conditions, the ultimate penetration of the asphalt cement, fluxing oil, and powdered hard asphalt when fluxed together into a blend in the finished and laid composition will be about 72. As the next lowest penetration range for asphalt cement is generally 70 to 85, which runs commercially to an average of about 78, it will be seen that if such asphalt cement is applied to the coarse aggregate particles in the first batch portion, the ultimate penetration of the blend will be about 56. The next lowest penetration range, from 50 to 60, will give an ultimate blend penetration of about 53, while the use of an asphalt cement in the 100 to 120 range will give an ultimate blend penetration of about 80. It will be understood that in all these examples the amount by weight of the asphalt cement is reckoned as being substantially equal to the weight of the powdered hard asphalt and fluxing oil together, and that it is assumed that all of each of the above two batch portions will be commingled to make the single or ultimate batch, but this equality and the using of all of each batch portion are exemplary only, are not essential, and are not presented by way of any limitation in the scope of the present invention.

So far as the principles of thus separately preparing two batch portions of aggregate material and then commingling them are concerned, the hot liquid asphalt cement used on the first or coarse aggregate batch portion particles is highly adhesive thereon and remains so without affecting flexibility during the initial mixing time state above, but with regard to the other or fine aggregate batch portion particles the powdered hard asphalt thereon is non-adhesive because the mixing time thereof with the fluxing oil is sufficiently short to prevent any appreciable softening of the hard asphalt by the oil. By reason of this it will be seen that when the two batch portions are commingled in the mixer, the powdered hard asphalt, being substantially unaffected by the fluxing oil during the mixing time therewith, provides a non-adhesive coating for the asphalt cement on the coarse aggregate particles, thus rendering the asphalt cement substantially non-adhesive as between aggregate particles, although not affecting the adhesion of the asphalt cement to the aggregate particles, and as a consequence maintaining the workability of the ultimate batch during the total mixing time, i. e., at least until discharge from the mixer. The amalgamating or blending action of the fluxing oil of course begins as soon as the oil contacts the asphalt cement and hard asphalt, but although during the total mixing time there is no action by the oil to any such degree as will prevent workability of the ultimate batch immediately after discharge from the mixer, the amalgamating or blending action of the oil presents thereafter the problem of controlling the action of the oil. It is therefore of the greatest importance that the ultimate batch be flexible and workable until spreading and compaction can take place. Stated in another way, it is of the greatest importance that during the laying time for the ultimate batch, that is, during the time that elapses after the ultimate batch is made and discharged from the mixer and until it is spread on the surface to be paved and is compacted, the amalgamating or blending action of the fluxing oil be controlled. If there is no control, that is, if the action of the fluxing oil is not sufficiently retarded until spreading and compaction can occur, the ultimate batch may set up and become too stiff to spread, and conversely, if the normal amalgamating action of the fluxing oil to a material degree is slower than a given job requires amalgamation should be accelerated. There are various factors here determining the speed with which the amalgamating or blending action of the fluxing oil should occur to a material degree, one of them being the distance from the plant to where the pavement is being laid and others being whether the ultimate batch is to be used more or less immediately or remotely in time regardless of travel distance or whether it is to be used for stock pile storage.

It will be realized that the rate of the amalgamating or blending action of the fluxing oil to a material degree prior to the laying and compaction of the ultimate batch can be controlled in one way simply by using hot asphalt cement having a different penetration range under the standard test conditions stated above than would otherwise be used, for the lower the penetration of the substituted asphalt cement the more prolonged would be the time until the action of the fluxing oil would effect such a degree of amalgamation or blending as would make spreading impossible, while the higher the penetration of the substituted asphalt cement the less would be the time that could elapse before the ultimate batch must be spread and compacted, but the above manner of control is not the only way by which the action of fluxing oil can be regulated, and it is much easier constantly to use asphalt cement of a proper given penetration range and vary the proportions of the fluxing oil and the powdered hard asphalt. It is therefore preferred in the practice of the present invention that while for the exemplary purposes stated above the quantities by weight of the fluxing oil and the powdered hard asphalt are equal, there may be inequality in their proportions with or without changing their total weight of their joint percentage of the exemplary ultimate batch. One example of this is to use variously greater quantities of fluxing oil by weight and corresponding lesser quantities of powdered hard asphalt by weight, in which case, so long as the penetration range of the asphalt cement on the coarse aggregate particles remains constant, the penetration of the ultimate blend will be higher and the amalgamating or blending action of the fluxing oil to a material degree before spreading and compaction will be accelerated, and a reverse example is to use variously lesser quantities of fluxing oil by weight and corresponding greater quantities of powdered hard asphalt by weight, in which case the penetration of the ultimate blend will be lower and the amalgamating or blending action of the fluxing oil will be retarded. The set up of ultimate batch can also be controlled by varying the proportions of paving asphalt cement on the one hand, and mixed flux oil and powdered asphalt on the other hand. The greater the proportion of paving asphalt cement the more rapid is the set up of the ultimate pavement.

To summarize the above process and the results following from the practice set forth, there is produced a paving composition one batch portion of the aggregate thereof (coarse) being coated with hot liquid asphalt cement which is adhesive and the other batch portion of the aggregate thereof (fines with or without filler) being coated with fluxing oil and powdered hard asphalt which is non-adhesive and does not become so to any material extent while in the mixer (s). These two batch portions, or various quantities of each of them as conditions require, are then mixed together, and this results in the non-adhesive fine aggregate particles carrying the powdered hard asphalt becoming coated on and commingled with the coarser aggregate particles carrying the adhesive asphalt cement, thereby rendering the cement substantially non-adhesive as between aggregate particles so that the ultimate batch remains workable for spreading and for compaction, as by a roller or other suitable pressure applying instrumentality, until the amalgamating or blending action of the fluxing oil takes place to a material degree, the time of this action being controlled by varying the proportions of fluxing oil and powdered hard asphalt. It is frequently advantageous to provide a stock pile of the fine aggregate coated with flux oil and powdered asphalt and blend appropriate quantities thereof with batches of coarse aggregate coated with hot paving asphalt.

The principles and steps stated above when hot liquid asphalt cement is used on the coarse aggregate particles are substantially the same as when asphalt cement is used in the form of a cut back or an emulsion. If a cut back asphalt cement is used, however, its asphalt cement content, rather than its total content, is to be considered in determining the amount to be applied to the coarse aggregate particles, and the cut back should be somewhat warmed, although ordinarily not more than to a temperature of about 140° F. before introducing it into the mixer. The aggregate should be dry as stated above, and while the ultimate batch will be slower curing after being compacted, and will have a longer laying time, it is to be particularly noted that after the volatile and slowly volatile cut back oils leave the composition, the curing of the composition, that is, the complete amalgamation of the asphalt cement and the hard asphalt into a substantially homogeneous binder for particles of aggregate, does not result in a hard and rigid construction, subject to cracking and lacking toughness, for the added non-volatile fluxing oil still remains in the composition, and during compaction in road laying and aided by the subsequent kneading action of traffic the fluxing oil effects the ultimate amalgamation of the asphaltic materials as stated above and remains a permanent part of them to provide a substantially uniform blend thereof which holds the particles of aggregate and filler, if used, properly and evenly conjoined. If some of the volatile solvent tends to be retained in the finished pavement as in the laying of dense pavements, this can be compensated for by increasing the proportions of powdered hard asphalt.

With the use of asphalt cement emulsions, the asphalt cement content thereof, rather than the total content, must be considered as in the case of cut backs, but the particles of coarse aggregate need not be dry when the emulsion is mixed therewith, and the emulsion is applied cold. The problem of when an emulsion will break, which at one time was of considerable importance and led to asphalt cement being seldom used in emulsion form, is today of little importance. Older emulsions were so unsatisfactorily constructed that their breaking could not be accurately predicted under any given conditions, but the advances made in the art in recent years have resulted in emulsions which are dependable and which will break in the pug mill, so that the water can be easily removed therefrom, or will break on the job, as desired. In this latter case, however, it will be understood that since there will be water in the mass spread on the surface to be paved, asphalt cement emulsions should not be used unless the surface itself is water absorptive or it is practicable to make proper road drainage arrangements.

Regardless of the liquid form of asphalt cement which may be used in practicing the process herein disclosed, it will be seen that the ultimate composition resulting therefrom is characterized by the thorough distribution of the fine aggregate particles carrying flux oil and powdered hard asphalt among the coarse aggregate particles carrying the paving asphalt thereby securing a complete bond and hence no opportunity for internal movement. The particles of aggregate in my composition cannot move around or over one another when the highway is in use and hence cause waviness and pocket formations. No dependence is placed on volatile or slowly volatile oils as a flux or to impart flexibility and workability to the ultimate batch prior to spreading and compaction to complete amalgamation and blending. The composition herein disclosed may be laid cold as the fluxing oil provides that the ultimate batch need not be heated when applied to the surface to be paved since the amalgamation of the asphaltic ingredients is accomplished by permanent solvent action of the fluxing oil.

While reference has been made to the use of paving asphalt cement and powdered hard asphalt, it is to be understood that other bituminous materials may be used such as pitches, coal tar residues and the like.

While the composition herein disclosed has been referred to as a paving composition, it will be realized that it has other uses, such as sidewalks, levee linings, roofing, asphalt block material, and the like, and it will also be seen that the herein disclosed process does not differ in principle or steps when the composition is made for application to these other uses except, of course, that in the making of blocks parts of the ultimate batch are placed in forms and are compacted by a suitable press.

I claim:

1. That improvement in the art of making bituminous paving and the like compositions which consists in preparing a first batch portion by mixing relatively coarse aggregate particles with bituminous cement in liquid form so that said particles are coated thereby, preparing separately a second batch portion by mixing relatively fine aggregate particles with fluxing oil and with powdered hard bitumen adapted to gradually amalgamate with the fluxing oil so that said particles are coated thereby and the flux and powdered hard bitumen are distributed substantially evenly throughout said second batch portion; and thereafter bringing the two batch portions together and mixing them until they are distributed substantially evenly throughout each other.

2. That improvement in the art of making bituminous paving and the like compositions which consists in preparing a first batch portion by mixing relatively coarse aggregate particles with bituminous cement in liquid form so that said particles are coated thereby, preparing separately a second batch portion by mixing relatively fine aggregate particles and mineral filler with fluxing oil and with powdered hard bitumen adapted to gradually amalgamate with the fluxing oil so that said particles of aggregate and filler are coated thereby and the flux oil and powdered hard bitumen are distributed substantially evenly throughout said second batch portion; and thereafter bringing the two batch portions together and mixing them until they are distributed substantially evenly throughout each other.

3. That improvement in the art of making bituminous paving and the like compositions which consists in preparing a first batch portion by mixing relatively coarse aggregate particles with hot liquid bituminous cement so that said particles are coated thereby; preparing separately a second batch portion by mixing relatively fine aggregate particles with fluxing oil and with powdered hard bitumen adapted to gradually amalgamate with the fluxing oil so that said particles are coated thereby, and the fluxing oil and powdered hard bitumen are distributed substantially evenly throughout said second batch portion; and thereafter bringing the two batch portions together and mixing them until they are distributed substantially evenly throughout each other.

4. That improvement in the art of making bituminous paving and the like compositions which consists in preparing a first batch portion by mixing relatively coarse aggregate particles with a cut back bituminous cement so that said particles are coated thereby; preparing separately a second batch portion by mixing relatively fine aggregate particles with fluxing oil and with powdered hard bitumen adapted to gradually amalgamate with the fluxing oil so that the particles are coated thereby and the fluxing oil and powdered hard bitumen are distributed substantially evenly throughout said second batch portion; and thereafter bringing the two batch portions together and mixing them until they are distributed substantially evenly through each other.

5. That improvement in the art of making bituminous paving and the like compositions which consists in preparing a first batch portion by mixing relatively coarse aggregate particles with emulsified bituminous cement so that said particles are coated thereby; preparing separately a second batch portion by mixing relatively fine aggregate particles with fluxing oil and with powdered hard bitumen adapted to gradually amalgamate with the fluxing oil so that said particles are coated thereby, and the fluxing oil and powdered hard bitumen are distributed substantially evenly throughout said second batch portion; and thereafter beringing the two batch portions together and mixing them until they are distributed substantially evenly throughout each other.

6. That improvement in the art of making bituminous paving and the like compositions which consists in preparing a first batch portion by mixing relatively coarse aggregate particles with bituminous cement in liquid form so that said particles are coated thereby; preparing separately a second batch portion by mixing relatively fine aggregate particles with fluxing oil so that said particles are coated thereby, and then introducing into said second batch portion powdered hard bitumen adapted to gradually amalgamate with the fluxing oil and continuing the mixing so that said powdered hard asphalt is distributed substantially evenly throughout said second batch portion, said fluxing oil and said powdered hard bitumen being together substantially equal by weight to the weight of the asphalt cement in the first batch portion; and thereafter bringing at least a part of each of the two batch portions together and mixing them until they are distributed substantially evenly throughout each other.

7. That improvement in the art of making bituminous paving and the like compositions which consists in preparing a first batch portion by mixing relatively coarse aggregate particles with bitumen cement in heat liquefied form so that said particles are coated thereby, said bituminous cement having a penetration substantially in excess of 20 at 77° F., 100 grams, and 5 seconds; preparing separately a second batch portion by mixing relatively fine aggregate particles with fluxing oil and with powdered hard bitumen adapted to gradually amalgamate with the fluxing oil and having a penetration not substantially in excess of 5 at 77° F., 100 grams and 5 seconds, so that said particles are coated thereby, and the fluxing oil and powdered hard bitumen are distributed substantially evenly throughout said second batch portion; and thereafter bringing the two batch portions together and mixing them until they are distributed substantially evenly throughout each other.

8. That improvement in the art of making bituminous paving and the like compositions which consists in preparing a first batch portion by mixing relatively coarse aggregate particles with bituminous cement in liquid form so that said particles are coated thereby, said bituminous cement having a penetration substantially in excess of 20 at 77° F., 100 grams, and 5 seconds; preparing separately a second batch portion by mixing relatively fine aggregate particles in amount up to 10 per cent by weight of the combined weight of the fine aggregate with fluxing oil so that said particles of aggregate are coated thereby, and then introducing into said second batch portion powdered hard bitument adapted to gradually amalgamate with the fluxing oil and having a penetration not substantially in excess of 5 to 77° F., 100 grams, and 5 seconds, and continuing the mixing so that said powdered hard bitumen is distributed substantially evenly throughout said second batch portion; and thereafter bringing the two batch portions together and mixing them until they are distributed substantially evenly throughout each other.

9. That improvement in the art of making bituminous paving and the like compositions which consists in preparing a first batch portion by mixing relatively coarse aggregate particles with bituminous cement in liquid form so that said particles are coated thereby, said bituminous cement having a penetration substantially in excess of 10 at 77° F., 100 grams, and 5 seconds; preparing separately a second batch portion by mixing relatively fine aggregate particles with fluxing oil and with powdered hard bitumen adapted to gradually amalgamate with the fluxing oil and having a penetration not substantially in excess of 5 at 77° F., 100 grams, and 5 seconds, so that said particles are coated thereby, and the fluxing oil and powdered hard bitumen are distributed substantially evenly throughout said second batch portion, said fluxing oil and said powdered hard butment being together substantially equal by weight to the weight of the bituminous cement in the first batch portion; and thereafter bringing at least a part of each of the two batch portions together and mixing them until they are distributed substantially evenly throughout each other.

FRANK B. McGRANE.

CERTIFICATE OF CORRECTION.

Patent No. 2,349,446.  May 23, 1944.

FRANK B. McGRANE.

It is hereby certified that error appears in the printed specification of the above numbered patent requiring correction as follows: Page 2, second column, line 55, for "pound" read --pounds--; page 5, first column, line 52, for "coarse" read --coarser--; page 6, first column, line 14, claim 5, for "beringing" read --bringing--; line 38, claim 6, for "evently" read --evenly--; and second column, line 19, claim 8, for "bitument" read --bitumen--; line 22, same claim, for "to 77° F." read --at 77° F.--; and that the said Letters Patent should be read with this correction therein that the same may conform to the record of the case in the Patent Office.

Signed and sealed this 25th day of July, A. D. 1944.

Leslie Frazer

(Seal) Acting Commissioner of Patents.